(12) United States Patent
Kapustin et al.

(10) Patent No.: US 12,098,529 B2
(45) Date of Patent: Sep. 24, 2024

(54) ATMOSPHERIC WATER HARVESTER WITH CLIMATE-ADJUSTABLE ADSORBANT PROPERTIES

(71) Applicant: Water Harvesting, Inc., Fremont, CA (US)

(72) Inventors: Ievgen Kapustin, Fremont, CA (US); David S. Kuo, Fremont, CA (US); Bruno Marchon, Fremont, CA (US)

(73) Assignee: Water Harvesting, Inc., Fremont, CA (US)

( * ) Notice: Subject to any disclaimer, the term of this patent is extended or adjusted under 35 U.S.C. 154(b) by 0 days.

(21) Appl. No.: 18/371,700

(22) Filed: Sep. 22, 2023

(65) Prior Publication Data

US 2024/0060277 A1 Feb. 22, 2024

Related U.S. Application Data

(63) Continuation of application No. 18/073,977, filed on Dec. 2, 2022, now Pat. No. 11,781,295, which is a
(Continued)

(51) Int. Cl.
*E03B 3/28* (2006.01)
*B01D 53/04* (2006.01)
(Continued)

(52) U.S. Cl.
CPC ............ *E03B 3/28* (2013.01); *B01D 53/0446* (2013.01); *B01D 53/06* (2013.01); *B01D 53/261* (2013.01);
(Continued)

(58) Field of Classification Search
CPC ....... E03B 3/28; B01D 53/0446; B01D 53/06; B01D 53/261
See application file for complete search history.

(56) References Cited

U.S. PATENT DOCUMENTS

| | | | |
|---|---|---|---|
| 1,559,762 | A | 11/1925 | Newman |
| 4,180,985 | A | 1/1980 | Northrup, Jr. |

(Continued)

FOREIGN PATENT DOCUMENTS

| | | |
|---|---|---|
| CA | 3120865 | 7/2023 |
| CN | 102639540 A | 8/2012 |

(Continued)

OTHER PUBLICATIONS

PCT International Patent Application No. PCT/US23/33098, International Search Report and Written Opinion of the International Searching Authority dated Nov. 30, 2023, 11 pages.
(Continued)

*Primary Examiner* — Elizabeth J Martin
(74) *Attorney, Agent, or Firm* — Craig R. Miles; CR MILES P.C.

(57) ABSTRACT

Provided herein are atmospheric water harvesting systems that are tailored with an optimal adsorption threshold, based on energy cost and water availability considerations. The systems include a plurality of adsorbent modules, each containing metal organic frameworks of various adsorption thresholds. Such a design enables real time adjustment to achieve optimal harvesting conditions in changing atmospheric conditions, whether for daily or seasonal humidity variations.

7 Claims, 4 Drawing Sheets

Related U.S. Application Data continuation of application No. 17/867,227, filed on Jul. 18, 2022, now Pat. No. 11,536,010, which is a continuation of application No. PCT/US2022/012990, filed on Jan. 19, 2022.

(60) Provisional application No. 63/139,211, filed on Jan. 19, 2021.

(51) Int. Cl.
  *B01D 53/06* (2006.01)
  *B01D 53/26* (2006.01)
(52) U.S. Cl.
  CPC .. *B01D 2257/80* (2013.01); *B01D 2259/4009* (2013.01)

(56) References Cited

U.S. PATENT DOCUMENTS

| | | |
|---|---|---|
| 4,304,577 A | 12/1981 | Ito et al. |
| 4,646,541 A | 3/1987 | Reid et al. |
| 5,565,139 A | 10/1996 | Walker et al. |
| 5,632,802 A | 5/1997 | Grgich et al. |
| 5,632,954 A | 5/1997 | Coellner et al. |
| 6,684,648 B2 | 2/2004 | Faqih |
| 8,627,673 B2 | 1/2014 | Hill et al. |
| 9,134,038 B2 | 9/2015 | Lee et al. |
| 9,446,969 B1 | 9/2016 | Redman et al. |
| 10,266,737 B2 | 4/2019 | Van Horn et al. |
| 10,695,741 B2 | 6/2020 | Motkuri et al. |
| 10,829,913 B1 | 11/2020 | Ahmed et al. |
| 10,857,855 B2 | 12/2020 | Tomita et al. |
| 11,029,045 B2 | 6/2021 | Woods et al. |
| 11,065,573 B2 | 7/2021 | Matuska et al. |
| 11,536,010 B2 | 12/2022 | Kapustin et al. |
| 11,679,339 B2 | 6/2023 | Van de Mortel |
| 11,781,295 B2 | 10/2023 | Kapustin et al. |
| 2004/0107832 A1 | 6/2004 | Tongue et al. |
| 2004/0123615 A1 | 7/2004 | Yabu |
| 2004/0123616 A1 | 7/2004 | Lee et al. |
| 2004/0244398 A1 | 12/2004 | Radermacher et al. |
| 2005/0044862 A1 | 3/2005 | Vetrovec et al. |
| 2006/0130652 A1 | 6/2006 | Takewaki et al. |
| 2007/0028769 A1 | 2/2007 | Eplee et al. |
| 2009/0151368 A1 | 6/2009 | Bar |
| 2009/0260385 A1 | 10/2009 | Hill et al. |
| 2010/0126344 A1 | 5/2010 | Stein et al. |
| 2011/0056220 A1 | 3/2011 | Caggiano |
| 2011/0088552 A1 | 4/2011 | Ike et al. |
| 2011/0296858 A1 | 12/2011 | Caggiano |
| 2012/0172612 A1 | 7/2012 | Yaghi et al. |
| 2013/0036913 A1 | 2/2013 | Fukudome |
| 2013/0061752 A1 | 3/2013 | Farha et al. |
| 2013/0192281 A1 | 8/2013 | Nam et al. |
| 2013/0269522 A1 | 10/2013 | DeValve |
| 2013/0312451 A1 | 11/2013 | Max |
| 2014/0138236 A1 | 5/2014 | White |
| 2014/0165637 A1 | 6/2014 | Ma |
| 2014/0287150 A1 | 9/2014 | Miljkovic et al. |
| 2014/0326133 A1 | 11/2014 | Wang et al. |
| 2014/0338425 A1 | 11/2014 | Kalbassi et al. |
| 2016/0030858 A1 | 2/2016 | Giacomini |
| 2016/0084541 A1 | 3/2016 | Aguado et al. |
| 2016/0334145 A1 | 11/2016 | Pahwa et al. |
| 2017/0008915 A1 | 1/2017 | Yaghi et al. |
| 2017/0113184 A1 | 4/2017 | Eisenberger |
| 2017/0129307 A1 | 5/2017 | Zhou et al. |
| 2017/0211851 A1 | 7/2017 | Feng et al. |
| 2017/0234576 A1 | 8/2017 | Kawagoe et al. |
| 2017/0292737 A1 | 10/2017 | Moon |
| 2017/0354920 A1 | 12/2017 | Switzer et al. |
| 2018/0043295 A1 | 2/2018 | Friesen et al. |
| 2018/0171604 A1 | 6/2018 | Kim et al. |
| 2018/0209123 A1 | 7/2018 | Bahrami et al. |
| 2018/0261882 A1 | 9/2018 | Chang et al. |
| 2019/0100903 A1 | 4/2019 | Panda et al. |
| 2019/0234053 A1 | 8/2019 | Kim et al. |
| 2019/0323714 A1 | 10/2019 | Cui |
| 2020/0009497 A1 | 1/2020 | Matuska et al. |
| 2020/0206679 A1 | 7/2020 | Stuckenberg |
| 2020/0283997 A1 | 9/2020 | Salloum et al. |
| 2020/0316514 A1 | 10/2020 | Fuchs et al. |
| 2020/0363078 A1 | 11/2020 | Mulet et al. |
| 2021/0062478 A1 | 3/2021 | Friesen et al. |
| 2021/0156124 A1 | 5/2021 | Yaghi et al. |
| 2021/0237535 A1 | 8/2021 | Goel et al. |
| 2021/0283528 A1 | 9/2021 | Pokorny et al. |
| 2021/0283574 A1 | 9/2021 | Yaghi et al. |
| 2022/0001328 A1 | 1/2022 | Yoon et al. |
| 2022/0106203 A1 | 4/2022 | Marchon et al. |
| 2022/0170247 A1 | 6/2022 | Yaghi et al. |
| 2022/0389691 A1 | 12/2022 | Kuo et al. |
| 2023/0063572 A1 | 3/2023 | Kapustin |
| 2023/0264138 A1 | 8/2023 | McGrail et al. |

FOREIGN PATENT DOCUMENTS

| | | |
|---|---|---|
| CN | 106029674 A | 10/2016 |
| CN | 1077722290 A | 2/2018 |
| CN | 114182784 A | 3/2022 |
| EP | 2507247 A1 | 10/2012 |
| EP | 3721971 A1 | 10/2020 |
| GB | 2540798 A | 2/2017 |
| JP | S63-107720 A | 5/1988 |
| JP | 2013-512223 A | 4/2013 |
| JP | 2017-509607 A | 4/2017 |
| JP | 2018080146 A | 5/2018 |
| WO | WO 03/097216 A1 | 11/2003 |
| WO | WO 2015/127033 A1 | 8/2015 |
| WO | WO2016/186454 A1 | 11/2016 |
| WO | WO 2018/118377 A1 | 6/2018 |
| WO | WO 2018/230430 A1 | 12/2018 |
| WO | WO 2019/010102 A1 | 1/2019 |
| WO | WO 2019/058158 A1 | 3/2019 |
| WO | WO 2019/082000 A1 | 5/2019 |
| WO | WO 2019/152962 A2 | 8/2019 |
| WO | WO 2020/036905 A1 | 2/2020 |
| WO | WO 2020/099561 A1 | 5/2020 |
| WO | WO 2020/112899 A1 | 6/2020 |
| WO | WO 2020/154427 A1 | 7/2020 |
| WO | WO 2021/034477 A1 | 2/2021 |
| WO | WO 2021/067179 A1 | 4/2021 |
| WO | WO 2021/162894 A1 | 8/2021 |
| WO | WO 2023/146800 A1 | 8/2023 |
| WO | WO 2023/181058 A1 | 9/2023 |

OTHER PUBLICATIONS

U.S. Appl. No. 17/424,147, Office Action mailed Oct. 2, 2023.
Brazilian Patent Application No. BR112021010139-0, Office Action mailed Jul. 9, 2023, 4 pages.
Brazilian Patent Application No. BR112021002648-7, Office Action mailed Jul. 3, 2023, 4 pages.
Canadian Patent Application No. 3,171,282, Office Action dated Oct. 27, 2023, 11 pages.
Canadian Patent Application No. 3,167,734, Office Action dated Aug. 31, 2023, 6 pages.
Philippine Patent Application No. 1/2021/551201, Substantive Examination Report dated Sep. 6, 2023, 6 pages.
Gleick. Water in Crisis: A Guide to the World's Fresh Water Resources. Chapter 2, pp. 13-24. Aug. 1993, Oxford University Press, New York, USA.
Canivet et al. Water adsorption in MOFs: fundamentals and applications. Chem. Soc. Rev., Aug. 2014, 43(16):5594-5617.
Clus et al. Study of dew water collection in humid tropical islands. Hydrol., Oct. 2008, 361(1-2):159-171.
Ding et al. Carbon capture and conversion using metal-organic frameworks and MOF-based materials. Chem. Soc. Rev., May 2019, 48(2):2783-2828.
Fang et al. One-Pot Synthesis of Two-Linker Mixed Al-Based Metal-Organic Frameworks for Modulated Water Vapor Adsorption. Cryst. Growth Des., Aug. 2020, 20, 10, 6565-6572.

(56) References Cited

OTHER PUBLICATIONS

Fathieh et al. Practical water production from desert air. Sci. Adv., Jun. 2018, 4(6):eaat3198.

Fracaroli et al. Metal-Organic Frameworks with Precisely Designed Interior for Carbon Dioxide Capture in the Presence of Water. Am. Chem. Soc., Jun. 2014, 136, pp. 8863-8866.

Furukawa et al. Water Adsorption in Porous Metal-Organic Frameworks and Related Materials. J. Am. Chem. Soc., Mar. 2014, 136(11):4369-4381.

Global Cooling Prize. Transaera and partner Haier. Website, https://globalcoolingprize.org/transaera-inc/, originally downloaded Nov. 21, 2022, 3 pages.

Hanikel et al. Rapid Cycling and Exceptional Yield in a Metal-Organic Frameworks for Water Harvester. ACS Cent. Sci., Aug. 2019, 5(10):1699-1706.

Janiak et al. Solid-Solution Mixed-Linker Synthesis of Isoreticular Al-Based MOFs for and Easy Hydrophilicity Tuning in Water-Sorption Heat Transformations. Chem. Mater., May 2019, 31, 11, 4051-4062.

Kalmutzki et al. Metal-Organic Frameworks for Water Harvesting from Air; Adv. Mater. Sep. 2018, 30(37):1704304.

Kim et al. Water harvesting from air with metal-organic frameworks powered by natural sunlight. Science, Apr. 2017, 356:430-434.

Klemm et al. Fog as a Fresh-Water Resource: Overview and Perspectives. Ambio, May 2012, 41(3):221-234.

Kummer et al. A functional full-scale heat exchanger coated with aluminum fumarate metal-organic framework for adsorption heat transformation. Ind. Eng. Chem. Res., Jul. 2017, 56(29):8393-8398.

Lee et al. Water harvest via dewing. Langmuir, Jun. 2012, 28(27):10183-10191.

Li et al. Incorporation of Alkylamine into Metal-Organic Frameworks through a Brønsted Acid-Base Reaction for CO2 Capture. ChemSusChem., Oct. 2016, 9(19):2832-2840.

Muselli et al. Dew water collector for potable water in Ajaccio (Corsica Island, France). Atmos. Res., Sep. 2002,64,297-312.

Park et al. Optimal Design of Permeable Fiber Network Structures for Fog Harvesting. Langmuir, Oct. 2013, 29(43):13269-13277.

Schemenauer et al. A Proposed Standard Fog Collector for Use in High-Elevation Regions. Appl. Meteorol., Nov. 1994, 33(11):1313-1322.

Tu et al. Progress and Expectation of Atmospheric Water Harvesting. Joule, Aug. 2018, 2(8):1452-1478.

Wahlgren. Atmospheric Water Vapour Processor Designs for Potable Water Production: A Review. Water Res., Jan. 2001, 35(1):1-22.

Zhou et al. Atmospheric Water Harvesting: A Review of Material and Structural Designs. ACS Materials Lett., May 2020, 2(7):671-684.

PCT International Patent Application No. PCT/US22/12990, International Search Report and Written Opinion of the International Searching Authority dated Apr. 7, 2022, 14 pages.

PCT International Patent Application No. PCT/US19/63442, International Search Report and Written Opinion of the International Searching Authority dated Jan. 22, 2020, 7 pages.

PCT International Patent Application No. PCT/US20/14647, International Search Report and Written Opinion of the International Searching Authority dated May 5, 2020, 11 pages.

PCT International Patent Application No. PCT/US20/53052, International Search Report and Written Opinion of the International Searching Authority dated Jan. 4, 2021, 10 pages.

PCT International Patent Application No. PCT/US21/16261, International Search Report and Written Opinion of the International Searching Authority dated Apr. 16, 2021, 8 pages.

PCT International Patent Application No. PCT/US21/47491, International Search Report and Written Opinion of the International Searching Authority dated Dec. 7, 2021, 9 pages.

PCT International Patent Application No. PCT/US22/26153, International Search Report and Written Opinion of the International Searching Authority dated Jul. 28, 2022, 18 pages.

PCT International Patent Application No. PCT/US22/41142, International Search Report and Written Opinion of the International Searching Authority dated Jan. 20, 2023, 12 pages.

U.S. Appl. No. 63/139,211, filed Jan. 19, 2021.

U.S. Appl. No. 17/867,227, Office Action mailed Sep. 13, 2022.

U.S. Appl. No. 18/073,977, Office Action mailed Mar. 9, 2023.

PCT International Patent Application No. PCT/IN23/50258, International Search Report and Written Opinion of the International Searching Authority dated Jul. 4, 2023, 10 pages.

Japanese Patent Application No. 2021-529709, Office Action dated Nov. 21, 2023, 6 pages.

U.S. Appl. No. 18/384,992, Office Action mailed Jan. 23, 2024.

U.S. Appl. No. 18/077,417, Office Action mailed Jan. 17, 2024.

PCT International Patent Application No. PCT/US23/33101, International Search Report and Written Opinion of the International Searching Authority dated Feb. 8, 2024, 16 pages.

U.S. Appl. No. 17/763,413, Office Action mailed Feb. 6, 2024.

U.S. Appl. No. 18/077,417, Office Action mailed Mar. 29, 2024.

ATMOSPHERIC WATER HARVESTER WITH CLIMATE-ADJUSTABLE ADSORBANT PROPERTIES

CROSS-REFERENCE TO RELATED APPLICATION

This United States Patent Application is a continuation of U.S. patent application Ser. No. 18/073,977, filed Dec. 2, 2022, now U.S. Pat. No. 11,781,295, issued Oct. 10, 2023, which is a continuation of U.S. patent application Ser. No. 17/867,227, filed Jul. 18, 2022, now U.S. Pat. No. 11,536,010, issued Dec. 27, 2022, which is a continuation of International Patent Cooperation Treaty Patent Application No. PCT/US2022/012990, filed Jan. 19, 2022, which claims the benefit of U.S. Provisional Patent Application No. 63/139,211, filed Jan. 19, 2021, each hereby incorporated by reference herein.

FIELD

The present disclosure relates generally to water harvesting, and more specifically to systems and methods for harvesting water from surrounding air in changing atmospheric conditions.

BACKGROUND

Drinking water is scarce, especially in desert areas of North Africa and the Middle East. However, it is plentiful in the atmosphere, even in dry regions. In the last few years, atmospheric water harvesting using porous materials have been devised. See Atmospheric Water Harvesting: A Review of Material and Structural Designs, X. Zhou, H. Lu, F. Zhao, and G. Yu, ACS Materials Lett. 2020, 2, 7, 671-684. In particular, a class of metal organic frameworks (MOFs) with high water affinity has been developed that exhibits superior atmospheric water production. See H. Furukawa, F. Gándara, Y. B. Zhang, J. Jiang, W. L. Queen, M. R. Hudson, and O. M. Yaghi, *Water Adsorption in Porous Metal—Organic Frameworks and Related Materials*, J. Am. Chem. Soc. 2014, 136, 11, 4369-4381; M. J. Kalmutzki C. S. Diercks, and O. M. Yaghi, *Metal Organic Frameworks for Water Harvesting form Air*, Advanced Materials Volume 30, Issue 37, 2018, 1704304; and N. Hanikel et al., *Rapid Cycling and Exceptional Yield in a Metal-Organic Framework Water Harvester*; ACS Cent. Sci. 2019, 5, 10, 1699-1706, Aug. 27, 2019. This discovery has spurred the development of devices that could be deployed in the home, or in desert areas where no drinking water is available. See WO 2020/154427.

Depicted in FIG. 1 is a schematic of the water adsorption properties of various porous materials. The amount of water adsorbed (in mass %) is typically represented as a function of the relative humidity (in %) of the surrounding air in what is referred to as an adsorption isotherm. To first order and for all practical purposes, these curves are independent of temperature. MOF materials exhibit a step-like characteristic, which lets them capture and release water in a very narrow range of humidity (FIG. 2). This is in contrast with more conventional materials such as silica gel that exhibit a much more gradual isotherm, or zeolites that only desorb water at extremely low humidity levels (FIG. 1). Another advantage of MOF material is that the relative humidity $RH_0$ where adsorption occurs (adsorption threshold) can be adjusted by changing the molecular characteristics of the material itself. In fact, a continuous range of $RH_0$ can be obtained by mixing various organic or inorganic constituents into multivariational MOFs of different water affinity. See WO2020112899; Janiak, C. et al. Solid-Solution Mixed-Linker Synthesis of Isoreticular Al-Based MOFs for an Easy Hydrophilicity Tuning in Water-Sorption Heat Transformations *Chem. Mater.* 2019, 31, 11, 4051-4062; and Fang, Y. et al. One-Pot Synthesis of Two-Linker Mixed Al-Based Metal—Organic Frameworks for Modulated Water Vapor Adsorption *Cryst. Growth Des.* 2020, 20, 10, 6565-6572. Finally, a large adsorption capacity in mass % is also a requirement for a practical water harvester.

What is needed in the art are atmospheric water harvesters designed for optimal harvesting conditions in changing atmospheric conditions.

BRIEF SUMMARY

In some aspects, an atmospheric water harvesting system includes: a plurality of modules arranged into at least one adsorption stack; a desorption chamber, configured to receive a module saturated or nearly saturated with water from an adsorption stack, and cause desorption of water from the module positioned therein in the form of water vapor; a condensation chamber, positioned adjacent to or near the desorption chamber, and configured to condense at least a portion of the water vapor from the desorption chamber into liquid water; and a robotic arm, configured to (i) select and grasp a module in an adsorption stack that is saturated or nearly saturated with water, and (ii) transfer the module into the desorption chamber. In some embodiments, each module independently includes at least one metal organic framework positioned on or incorporated into a support. In some variations, at least one metal organic framework adsorbs water from surrounding air when the module is positioned within an adsorption stack.

In certain aspects, provided is also a method of harvesting water from the atmosphere using any of the atmospheric water harvesting systems described herein.

DESCRIPTION OF THE FIGURES

The present application can be best understood by reference to the following description taken in conjunction with the accompanying figures included in the specification.

DETAILED DESCRIPTION

Figure 1:
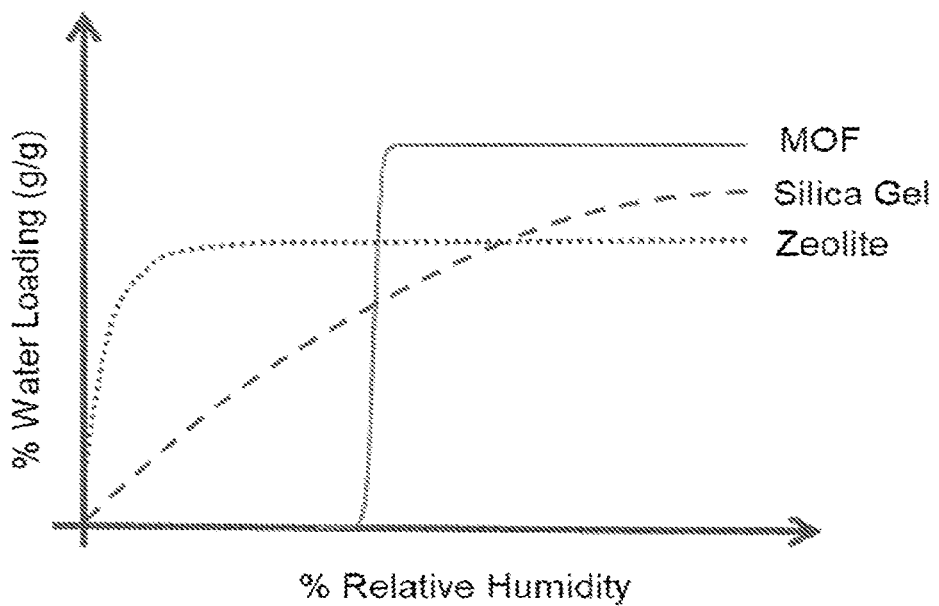
FIG. 1 depicts a graph comparing adsorption isotherms of MOF with conventional adsorbents such as silica gel and zeolite.

The following description sets forth exemplary systems, methods, parameters and the like. It should be recognized, however, that such description is not intended as a limitation on the scope of the present disclosure but is instead provided as a description of exemplary embodiments.

In some aspects, provided are atmospheric water harvesters that include a MOF adsorbent system with an optimal adsorption threshold, based on energy cost and water availability considerations. Provided are also methods of harvesting water from surrounding air using the atmospheric water harvesters described herein. In some embodiments, the design of the atmospheric water harvesters include several adsorbent assemblies, each made with MOF of various adsorption thresholds. Such harvesters allow for a real time adjustment of the MOF material for optimal harvesting conditions in changing atmospheric conditions, whether for daily or seasonal humidity variations. In some embodiments, the atmospheric water harvester is configured such that the adsorption process is fully separated from the desorption and condensation processes. This allows for multiple design configurations.

In one aspect, provided is an atmospheric water harvesting system comprising a plurality of MOF modules; a desorption chamber, a condensation chamber, and a robotic arm. Each MOF module contains at least one MOF. In some embodiments, the MOF modules are arranged into an adsorption stack. The adsorption stack can contain either MOF modules of the same MOF material (MOF "A") or MOF modules with the MOF material of different adsorption threshold $RH_0$ (MOF "A", "B", "C" etc.).

In some variations, the MOF comprises organic ligands having acid and/or amine functional group(s). In certain variations, the organic ligands have carboxylic acid groups. In other variations, the organic ligands have acid and/or amine functional group(s). In certain variations, the organic ligands have carboxylic acid groups. Any suitable MOFs capable of adsorbing and desorbing water may be employed in the systems provided herein. Suitable MOFs may include those described in, for example, Kalmutzki et al., Adv. Mat., 30(37), 1704304 (2018); Furukawa et al., J. Am. Chem. Soc. 2014, 136, 4369-4381; Y. Tu et. al., Joule, Vol 2, Issue 8(15), 1452-1475 (2018). In some variations, the MOF is: MOF-303: Al(OH)(HPDC), where HPDC is 1H-pyrazole-3,5-dicarboxylate; CAU-10: Al(OH)(IPA), where IPA is isophthalate; MOF-801: $Zr_6O_4(OH)_4(fumarate)_6$; MOF-841: $Zr_6O_4(OH)_4(MTB)_6(HCOO)_4(H_2O)_2$; Aluminum Fumarate: Al(OH)(fumarate); MIL-160: Al(OH)(FDA), where FDA is 2,5-furandicarboxylate; MIL-53: Al(OH)(TPA), where TPA is terephthalate; or Aluminum Phosphate: AlPO4-LTA. In some variations, the MOFs have pore sizes between about 0.5 nm about 1 nm, or between about 0.7 nm to about 0.9 nm. In certain variations, the MOFs have a hydrophilic pore structure. In certain variations, the MOFs have a hydrophilic pore structure comprising acid and/or amine functional groups. In certain variations, the MOFs have 1 D channels that allow for reversible water adsorption. Any combinations of the MOFs described herein may also be used. In some embodiments, the MOF is mixed with a binder to improve its properties for adhesion to a substrate or support.

Air is blown across the MOF modules, which are configured in such a way as to maximize its surface to volume ratio for rapid humidity exchange with the air. For example, in some variations, the MOF modules contain uniform layers of MOF coated on parallel plates. Water is adsorbed when the ambient relative humidity $RH_{amb}$ is larger than the adsorption threshold $RH_0$ (see FIG. 2), and adsorption rate Rat can be expressed as:

$$R_{ads} \sim S(T_{amb}) \times (RH_{amb} - RH_0) \qquad \text{Eq(1)}$$

where S(T) is the water saturation vapor pressure at temperature T, and $T_{amb}$ is the temperature of the ambient air. Adsorption rate directly affects water productivity (e.g. in liter per day, see FIG. 3).

The robotic arm (automation system) is configured to select and pick up the optimal MOF module based on the weather conditions. The robotic arm selects and grasps a MOF module from the adsorption stack after saturation (or near saturation) with water, and transfers such MOF module to the desorption chamber. The robotic arm replaces the MOF module after it is desorbed, grasping the desorbed MOF module from the desorption chamber and placing it back into the adsorption stack to reach saturation.

In some variations, the robotic arm includes robotic effectors, vacuum effectors, mechanical effectors, or electromechanical effectors. In certain variations, robotic end effectors may include flexible structures that may be manipulated between various orientations. For example, in one variation, the structures may include silicon bodies or other flexible material. In certain variations, vacuum end effectors may grasp items using suction. In other variations, mechanical or electromechanical end effectors may include pinchers, claws, grippers, or other rigid components that may be actuated relative to one another for grasping an item.

Figure 2:
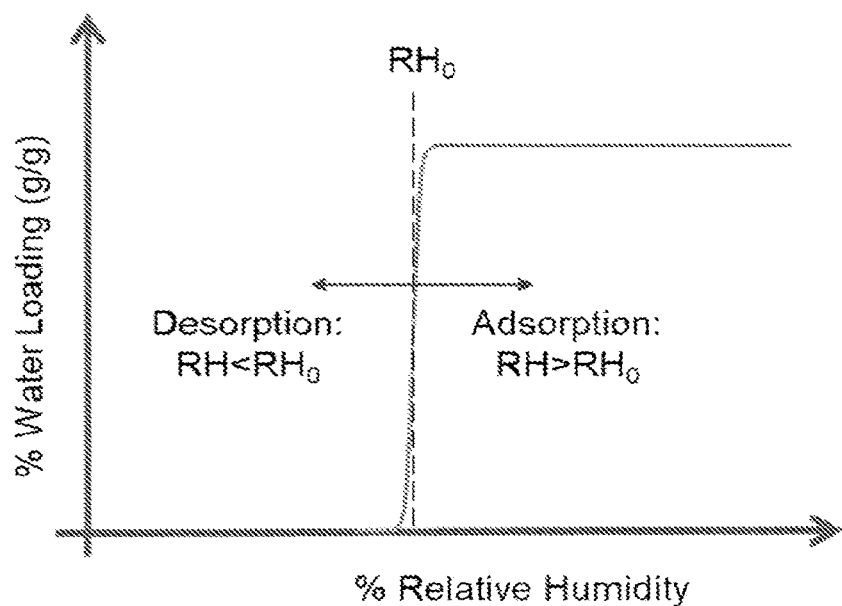
FIG. 2 depicts a graph showing adsorption and desorption in the context of atmospheric water harvesting using MOFs.

To get the water out of a MOF module that is saturated or nearly saturated with water, the robotic arm transfers the selected MOF module to the desorption chamber. In the desorption chamber, the humidity in the MOF module needs to be brought below $RH_0$ (FIG. 2). In some variations, this may be accomplished by elevating the air temperature, which raises the water saturation vapor pressure S(T), hence decreasing the relative humidity. The temperature $T_{des}$ at which water starts to desorb can be calculated using the following equation:

$$S(T_{des}) \div RH_0 = S(T_{amb}) \div RH_{amb} \qquad \text{Eq(2)}$$

In some variations, the desorption chamber includes a heat exchanger 2020a operable to increase temperature of said air to reduce relative humidity of said air below said adsorption threshold humidity to desorb said water from said at least one metal organic framework.

Equation (2) states that the absolute humidity (or water vapor concentration) is conserved during heating from $T_{amb}$ to $T_{des}$. In addition to the adsorption energy $E_{ads}$ required to desorb the water from the MOF, there is an energy cost $E_s$ also associated with raising the temperature (sensible energy). $E_s$ directly scales with desorption temperature, and an example of the variation of $E_s$ vs $RH_0$ is shown schematically in FIG. 3.

As temperature is raised, a small flow of air allows the desorbing moisture to get transferred to a condensation chamber housing at least one condenser. Once moist air arrives to the condenser, the liquid water condenses and is collected. In some variations, the moist air encounters cold exchanger 2023a including a series of cold plates, arranged to maximize surface area, allowing the liquid water to condense.

Figure 4:
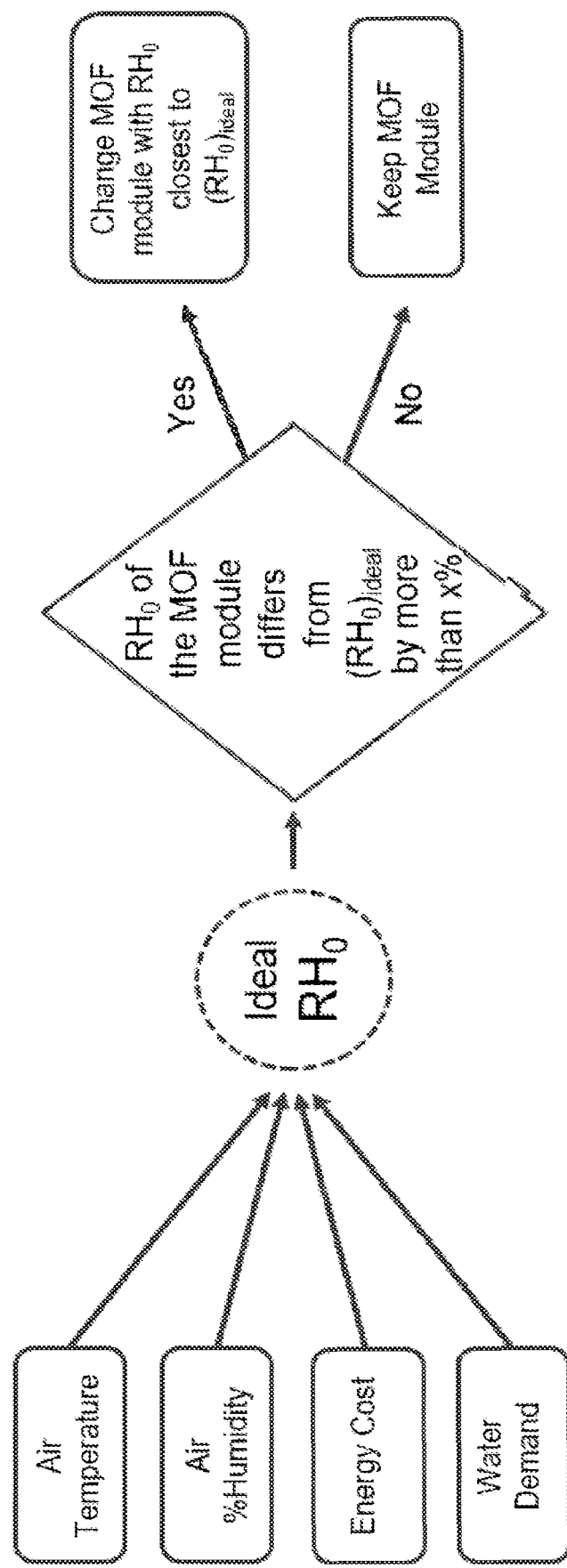
FIG. 4 depicts a decision tree for selecting the optimal type of MOF module to be moved to the desorption or condensation chambers

FIG. 4 illustrates the process by which a control system will select the optimal MOF module for the robotic arm to pick up. The system keeps track of the adsorption process to ensure that the modules have reached sufficient adsorption state before being selected for the desorption or condensation process. Based on the weather condition, the system will further pick the optimal type of MOF module to be moved to the desorption or condensation chambers, according to the decision tree shown in FIG. 4 (the algorithm that defines $(RH_0)_{ideal}$, and the value of x % are user defined).

For example, in a high relative humidity environment and when the water demand is not too severe, a MOF with high $RH_0$ can be selected to save on energy cost. Conversely, a low $RH_0$ MOF module can be selected when the environment relative humidity is low.

Figure 5A:
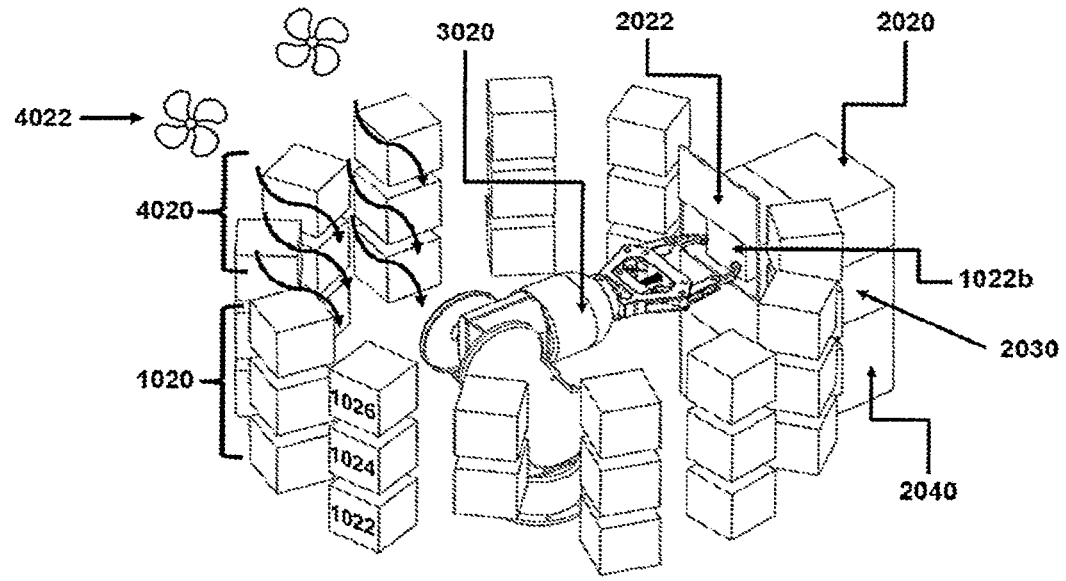
FIG. 5A depicts an exemplary atmospheric water harvesting system with changeable MOF modules in a circular configuration.
Figure 5B:
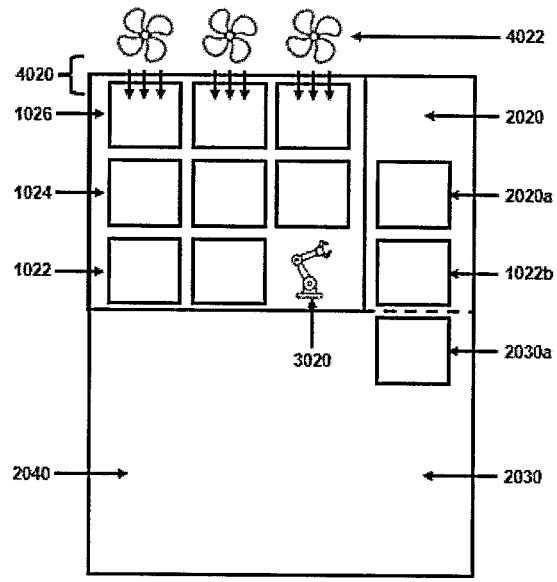
FIG. 5B depicts an exemplary atmospheric water harvesting system with changeable MOF modules in a stacked configuration.

With reference to FIGS. 5A & 5B, exemplary atmospheric water harvesting systems are depicted. These figures show systems where the adsorption process is fully separated from the desorption and condensation processes. FIG. 5A depicts a circular configuration with stacks of MOF modules 1020, arranged radially with desorption chamber 2020, condensation chamber 2030 and water collection tank 2040 and central automated material handler 3020 (a robotic arm in this example). As depicted in this exemplary embodiment of the system, adsorption stack 1020 includes MOF modules containing MOF material of different adsorption thresholds $RH_0$. As depicted in the figure, MOF module 1022 is an adsorbing module, and modules 1024 and 1026 are depicted in idle mode. The MOF modules sit in pre-arranged adsorption stack 1020 with air flow 4020 controlled by airflow management system 4022 (adsorption fans in this example) to optimize the adsorption process. Once desorbing MOF module 1022b is selected by the system, robotic arm 3020 will pick it up and place it in desorption chamber 2020 where water is desorbed using heat. Desorption chamber 2020 includes gate 2022 that opens in order to receive desorbing MOF module 1022b transferred by the robotic arm 3020 from an adsorption stack and close after the MOF module undergoes desorption. The resulting steam is then guided to the condensation chamber 2030 where liquid water is produced and collected into the water tank 2040. Once desorption is complete, the robotic arm will transfer this MOF module from the desorption chamber back to its original position in the adsorption stack. The next MOF module will then be picked up by the robotic arm and placed into desorption chamber 2020 for desorption, and the process continues. FIG. 5A shows a circular configuration, but multiple geometries can be used according to space and footprint conditions. FIG. 5B for instance shows a similar concept, but in a stacked configuration.

With reference again to FIG. 3, the value of $RH_0$ has a direct effect on both adsorption and desorption efficiencies. During adsorption, the rate of water capture scales with $(RH_{amb}-RH_0)$, as shown on Equation (1) above. Hence, for a given location/climate, a lower adsorption threshold enhances adsorption kinetics and water productivity. During desorption, however, the MOF modules (which may include, for example, MOF material and support) needs to be heated up in order to bring the relative humidity back below $RH_0$ (FIG. 2), and here a low adsorption threshold will require more thermal energy.

Figure 3:
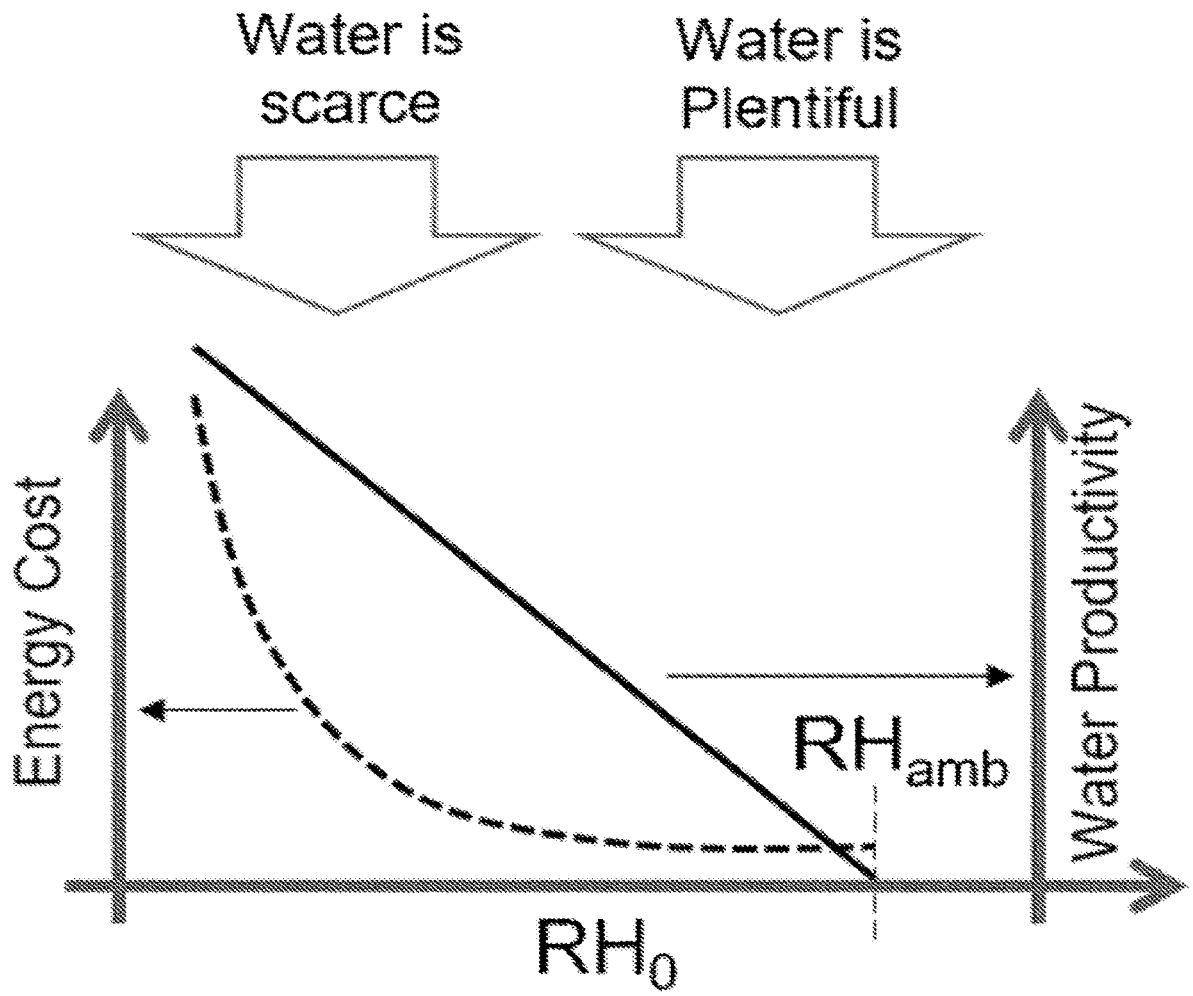
FIG. 3 depicts a graph showing optimization of water harvesting, in terms of productivity as compared to energy cost.

FIG. 3 graphically illustrates the choice to make when designing a MOF-based water harvester. In dry climates, where relative humidity $RH_{amb}$ of the ambient air is low, then the MOF material needs to have a low adsorption threshold $RH_0$ in order to capture water. However, when relative humidity is high, then the user has a choice between a lower energetic cost at the expense of water productivity (high $RH_0$), or a high water productivity at the expense of energetic cost (low $RH_0$). For instance, when water reserves are plentiful, the choice of a lower energy cost would be made, but when water is in high demand, a MOF with lower $RH_0$ will be preferred. Examples of this type of situation could be the daily variation of humidity in dry areas where lower temperatures during the night result in higher relative humidity. Also, annual humidity variation between seasons in a given area might also benefit from an adjustment of the MOF adsorption threshold.

What is claimed is:

1. A system, comprising:
a plurality of modules each containing at least one metal organic framework having an adsorption threshold humidity above which said at least one metal organic framework adsorbs water from air and below which said at least one metal organic framework desorbs water to said air, said adsorption threshold humidity differs between said plurality of modules;
a controller configured to select one or more modules to absorb said water from said air, wherein said controller configured to select said one or more modules based on one or more of:
relative humidity of said air;
adsorption threshold humidity of said at least one metal organic framework;
adsorption rate of said at least one metal organic framework;
energy cost to desorb said water from said at least one metal organic framework;
level of water reserves; and
a desorption chamber operable reduce relative humidity of said air to below said adsorption threshold humidity to desorb said water from said at least one metal organic framework.

2. The system of claim 1, further comprising a condensation chamber fluidically coupled to said desorption chamber, said condensation chamber operable to condense said water desorbed from said at least one metal organic framework.

3. The system of claim 1, wherein said desorption chamber raises water vapor saturation pressure of said air to reduce relative humidity of said air to below said adsorption threshold humidity to desorb said water from said at least one metal organic framework.

4. The system of claim 1, further comprising a heat exchanger operable to increase temperature of said air to reduce relative humidity of said air below said adsorption threshold humidity to desorb said water from said at least one metal organic framework.

5. The system of claim 2, further comprising a cold exchanger operable to decrease temperature to below dew point temperature of said air to condense said water from said air.

6. The system of claim 1, further comprising one or more fans to move said air across said metal organic framework contained in said one or more modules.

7. The system of claim 5, wherein said one or more fans recirculate said air between said desorption chamber and said condensation chamber.

* * * * *